United States Patent [19]

Chutjian et al.

[11] Patent Number: 4,649,273
[45] Date of Patent: Mar. 10, 1987

[54] VARIABLE ENERGY, HIGH FLUX, GROUND-STATE ATOMIC OXYGEN SOURCE

[75] Inventors: Ara Chutjian, La Cresenta; Otto J. Orient, Duarte, both of Calif.

[73] Assignee: The United States of America as represented by the Administrator of the National Aeronautics and Space Administration, Washington, D.C.

[21] Appl. No.: 852,468

[22] Filed: Apr. 10, 1986

[51] Int. Cl.⁴ ................................................ H01S 1/00
[52] U.S. Cl. .................................. 250/251; 250/396 R; 250/423 P; 376/127
[58] Field of Search .............. 250/251, 396 R, 423 P; 376/127, 129

[56] References Cited

U.S. PATENT DOCUMENTS

| | | |
|---|---|---|
| 3,569,706 | 3/1971 | Meckel et al. |
| 3,669,897 | 7/1972 | Hansen et al. |
| 3,713,967 | 1/1973 | Hamilton et al. |
| 3,742,219 | 6/1973 | Damm et al. |
| 4,070,580 | 1/1978 | Gallagher ......................... 250/423 P |
| 4,085,332 | 4/1978 | Fletcher ........................... 250/423 P |
| 4,140,576 | 2/1979 | Fink et al. |
| 4,140,577 | 2/1979 | Fink et al. |
| 4,158,775 | 6/1979 | Frosch ............................. 250/423 P |
| 4,600,840 | 7/1986 | Chutjian .......................... 250/338 |

Primary Examiner—Donald P. Walsh
Attorney, Agent, or Firm—Paul F. McCaul; John R. Manning; Thomas H. Jones

[57] ABSTRACT

A variable energy, high flux atomic oxygen source (10) comprising means (48) for producing a high density beam of molecules which will emit O⁻ ions when bombarded with electrons; means (44) for producing a high current stream of electrons at a low energy level passing through the high density beam of molecules to produce a combined stream (54) of electrons and O⁻ ions; means (32) for accelerating the combined stream to a desired energy level; means (12) for producing an intense magnetic field to confine the electrons and O⁻ ions; means (56, 58) for directing a multiple pass laser beam (62) through the combined stream to strip off the excess electrons from a plurality of the O⁻ ions to produce ground-state O atoms within the combined stream; electrostatic deflection means (68, 70) for deflecting the path of the O⁻ ions and the electrons in the combined stream; and, means (78) for stopping the O⁻ ions and the electrons and for allowing only the ground-state O atoms to continue as the source of the atoms of interest. The method and apparatus are also adaptable for producing other ground-state atoms and/or molecules.

36 Claims, 2 Drawing Figures

VARIABLE ENERGY, HIGH FLUX, GROUND-STATE ATOMIC OXYGEN SOURCE

ORIGIN OF THE INVENTION

This invention described herein was made in the performance of work under a NASA contract and is subject to the provisions of Public Law 96-517 (35 USC 202) in which the Contractor has elected not to retain title.

TECHNICAL FIELD

The present invention relates to apparatus and methods for producing a source of ground-state atomic/molecular particles and, more particularly, this invention relates to a variable energy, high flux, ground-state atomic oxygen source comprising means for producing a high density beam of molecules which will emit $O^-$ ions when bombarded with electrons; means for producing a high current stream of electrons at a low energy level of between 1 and 15 electron volts and for passing it through the high density beam of molecules to produce a combined stream of electrons and $O^-$ ions; means for accelerating the $O^-$ ions to a desired final velocity; means for imposing a high magnetic field to confine the electrons and $O^-$ ions; means for directing a multiple pass laser beam through the combined stream to strip off the excess electrons from a plurality of the $O^-$ ions to produce ground-state O atoms within the combined stream; electrostatic deflection means for deflecting the path of the $O^-$ ions and the electrons; and, means for stopping the $O^-$ ions and the electrons and for allowing only the ground-state O atoms to continue as the source of the atoms of interest.

DESCRIPTION OF THE PRIOR ART

Sources of streams of energetic, ground-state atomic particles are extremely useful in conducting experiments on Earth which duplicate the conditions found in outer space. For example, at the altitudes in which the Space Shuttle operates, there is a high concentration of ground-state atomic oxygen. As the Space Shuttle moves through this ground-state atomic oxygen, a glow is produced in the infra red region of the spectrum. In order to study the spacecraft glow and its effects on materials and instruments, it is necessary to have a means for producing an effective stream of ground-state atomic oxygen in a ground-based laboratory.

By way of background as to what is known in the art and of relevance to the present invention, there are several patents of interest.

It is known to produce a stream of moving atoms and to limit the stream to a velocity range by passing it through a gating structure. Typical of the prior art in this regard is U.S. Pat. No. 3,569,706 of Meckel et al. The atoms are produced by sputtering from metallic members, condensed layers of gases, and the like. The stream of atoms are then passed through a series of mechanical gates periodically creating openings along the path. As a function of the rate and duration of the gate openings, only atoms within a given speed of forward movement make it through the path. If an atom makes it through one gate and is moving too slow to be included in the range, it arrives at the next gate after the gate has opened and reclosed and is, therefore, stopped by the gate. In similar fashion, an atom moving faster than required to be included in the range arrives to the next gate before it opens and is stopped. As can be realized, such a manner of selecting the range of the moving stream is not very exact and, moreover, is not conducive to the production of a high flux (i.e., dense) stream of atoms.

One interesting approach to the problem is disclosed in U.S. Pat. No. 3,679,897 of Hansen et al. In the apparatus shown therein, particles of metal, or the like, are first accelerated along a path by a particle accelerator. The moving particles are then detected and vaporized into atoms by bursts from a high energy laser. The resultant atoms are then passed through an electrostatic field to remove any non-neutral atoms in the stream. The resultant stream of neutral atoms is neither high flux nor of easily selectable and adjustable low energy. Moreover, the resultant stream contains excited atomic states rather than only the desired ground atomic state.

Using a laser beam to neutralize a stream of negatively charged ions by photodetachment of the electrons from the ions is known and typified by U.S. Pats. Nos. 4,140,576 and 4,140,577 to Fink et al. In particular, the '576 patent of Fink et al. shows that it is desirable to pass the stream through a focus area of a multi-pass laser beam.

Thus, while methods and apparatus are known in the art for producing, inter alia, atomic oxygen, there is no known method and apparatus which will produce a high flux, low energy stream of ground- state oxygen atoms. More particularly, there is no such method and apparatus which will allow the production of a stream of low energy atoms of a selectable and adjustable final velocity or energy which can be held to close tolerances.

DISCLOSURE OF THE INVENTION

This invention is a variable energy, high flux, ground-state atomic oxygen source. It comprises means for producing a high density beam of molecules which will emit $O^-$ ions when bombarded with electrons; means for producing a high current stream of electrons at a low energy level of between 1 and 15 electron volts and for passing the stream of electrons through the high density beam of molecules to produce a combined stream of electrons and $O^-$ ions; means for accelerating the $O^-$ ions to a desired energy level; means for confining the electrons and $O^-$ ions by a high magnetic field; means for directing a multiple pass laser beam through the combined stream to strip off the excess electrons from a plurality of the $O^-$ ions to produce ground-state O atoms within the combined stream; electrostatic deflection means for deflecting the path of the $O^-$ ions and the electrons; and, means for stopping the $O^-$ ions and the electrons and for allowing only the ground-state O atoms to continue as the source of the atoms of interest.

The preferred energy level for the stream of $O^-$ ions following acceleration is in the range of 3 to 100 electron volts.

Means for producing an intense magnetic field to contain all the above-described means are included whereby the space-charge limited current of the combined stream is maximized. The means for producing the magnetic field comprises an elongated cylindrical coil operably connected to a source of electric current and disposed to contain all the remaining apparatus therein. The cylindrical coil is superconducting in nature in order to attain the high magnetic fields (1–10 Tesla) required.

Further, the means for directing a multiple pass laser beam through the the combined stream to strip off the excess electrons comprises a pair of curved mirrors disposed within the magnetic field producing superconducting coil so as to have the combined stream pass therebetween and a source of a laser beam disposed outside of the coil and adapted to direct its laser beam longitudinally into the coil and onto one of the pair of mirrors from whence it is directed back and forth between the pair of mirrors to form a focused region of multiple passes within the coil through which the combined stream passes.

To provide true adjustability with the ability to fix the electron volt level of the high current stream of electrons at the desired low energy level of between 1 and 15 electron volts and accurately accelerate the $O^-$ ions to the desired range of 3 to 100 electron volts, the source of electrons and associated accelerating apparatus comprises filament means connected to a high current source of electrical energy for producing a high current source of electrons; a plurality of gates of an electrically conductive material having apertures therethrough disposed with the apertures forming a path along a line between the filament means and the electrostatic deflection means, one of the gates being disposed adjacent to the high density beam of molecules between the filament means and high density beam of molecules and a second of the gates being disposed adjacent to the high density beam of molecules after the high density beam of molecules with respect to the filament means; an electrode of an electrically conductive material surrounding the filament means but not in contact therewith; a source of a negative electrical voltage connected to the electrode to repel the electrons from the filament means; a source of a first positive electrical voltage connected to the one of the gates; and, a source of a second positive electrical voltage connected to the second of the gates whereby the relative voltages determine the focusing of the electrons and set the electron voltage level of the electrons and the resultant combined stream including the $O^-$ ions.

DETAILED DESCRIPTION OF THE DRAWINGS

DETAILED DESCRIPTION OF THE INVENTION

Figure 1:
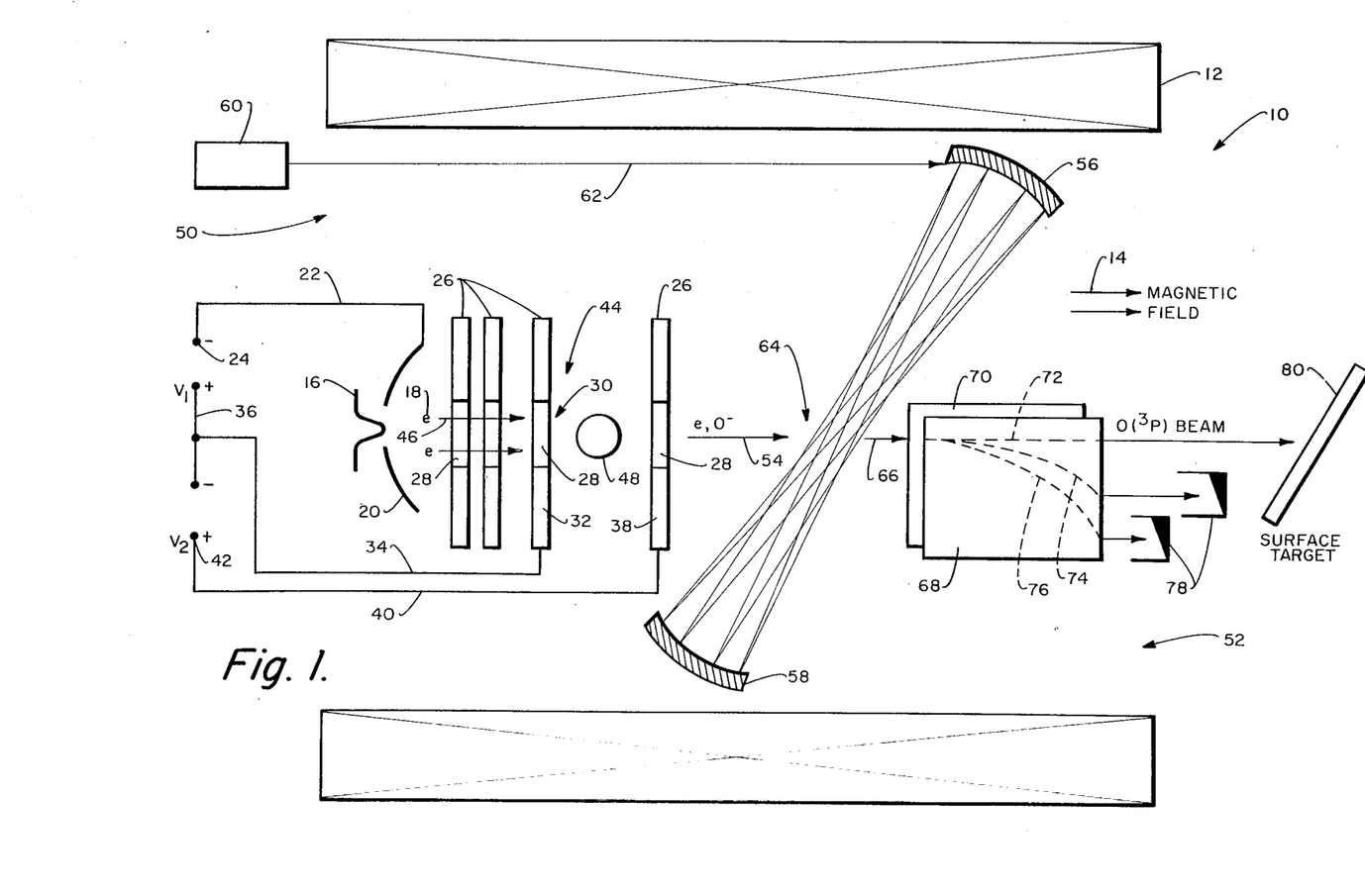
FIG. 1 is a drawing of a simplified longitudinal cross section through apparatus according to the present invention in a first embodiment thereof.

FIG. 1 shows in longitudinal cross section a first embodiment of apparatus for practicing the method of the present invention. It represents a side view, showing the curved mirrors and electrostatic deflection electrodes (to be described in detail shortly) in profile.

For purposes to be discussed in detail shortly, the principle element of the oxygen source apparatus of the present invention, generally indicated as 10, is cylindrical, superconducting, electrical coil 12 which, when electrically connected to an appropriate source of power (not shown) according to techniques well known in the art, produces an intense magnetic field in the range of 1 to 10 Tesla in the direction indicated by the arrows 14.

At 16 is a filament which, when also connected to an appropriate source of electrical power in a manner well known in the art, produces electrons "e" 18. The filament 16 is surrounded in non-contacting relationship by an electrically conductive annular electrode 20 which, in turn, is electrically connected by wire 22 to a negative electrical voltage at 24 on the power supply labelled as "$V_1$". A plurality of circular gates 26 of an electrically conductive material and having circular apertures 28 therethrough are aligned in front of the filament 16 so that the apertures 28 form a longitudinal path 30 within the magnetic field producing coil 12 along which the electrons 18 can travel away from the filament 16. A first one of the gates 26, indicated as 32, is connected by wire 34 to a first positive electrical voltage at 36, which is on the common connection between the power supplies labelled as "$V_1$" and "$V_2$", respectively. A second one of the gates 26, indicated as 38, is connected by wire 40 to a second positive electrical voltage at 42, which is on the power supply labelled as "$V_2$". As will be readily understood by those skilled in the art from the drawing, the second positive electrical voltage at 42 is more positive than the first positive electrical voltage at 36. When the filament 16 is connected to a high current source, the filament 16 in combination with the gates 26 and electrode 20 form a high current electron gun generally indicated as 44. The gun 44 produces and accelerates a high density stream of electrons 18, generally indicated by the arrows 46, to an energy level of between 1 and 15 electron volts. For the production of ground-state oxygen as is being described herein, the preferred energy level of the electron stream 46 is between 5 and 10 electron volts.

Without more, the stream 46 of electrons 18 would be very small in density due to the space-charge limited current associated with the electrons 18. That is, as is well known, like electrical charges repel one another. Thus, the negative charges of the electrons 18 will cause the electrons 18 to repel one another and, thereby, limit the density of the resultant electron stream 46. By enclosing the gun 44 (as well as the remaining components to be described hereinafter) within the superconducting coil 12 so that they are within the intense magnetic field 14 (i.e. of the range 1–10 Tesla) produced thereby, the space-charge limited current of the electrons 18 is counteracted by the magnetic field 14 to the extent that an increase in the density of 10,000 times can be realized. As a result, the space-charge limit is maximized and the stream 46 is truly a high density stream of electrons.

At 48 is a high density beam of molecules which will emit $O^-$ ions when bombarded with electrons. Beam 48 can be moving into or out of the figure as viewed. To produce the high density beam desired, beam 48 can be a normal or supersonic stream of $O_2$, NO, $N_2O$, or the like. Note that beam 48 is disposed in path 30 between the first and second gates 32, 38. The second gate 38 acts to accelerate the $O^-$ ions produced (along with the electrons 18 entrained therewith) to the desired energy level of 3 to 100 electron volts. The beam 48 can be supplied by pipes (not shown) entering the magnetic field producing coil 12 from the ends 50 or 52 and connected to an appropriate source (not shown) of the gas.

In operation, the apparatus described heretofore comprises an adjustable energy level, high current electron gun 44 producing a high density stream 46 of electrons 18 moving longitudinally along the axis of the coil 12 within the intense magnetic field 14 thereof and perpendicular to the beam 48 of molecules. The energy level of the stream 46 is set by the relative voltages applied to the electrode 20 and gates 32, 38 in a manner readily determinable by those skilled in the art without undue experimentation. In tested embodiments, the energy level of the stream 46 was set at a level within the range of 1 to 15 electron volts (with the range 5–10 ev being preferred), depending on the particular gas being used to form the O− ions. Because of the structure and method of operation, the energy level of the stream 46 can be set quite exactly and, further, can be maintained at the selected level within close tolerances of a fraction of an electron volt.

As the stream 46 of electrons 18 moves along path 30, it passes directly through the beam 48, bombarding the molecules of the gas thereof with electrons 18 and, thereby, causing O− ions to be emitted. The emitted O− ions join with the electrons 18 forming a combined stream, as indicated by the arrow 54, which is accelerated by the second gate 32 to its desired energy level and continues to move longitudinally down the coil 12 at that fixed velocity and energy level. The final energy of the O− ions (i.e. oxygen ions) is, therefore, substantially set by the voltage 42 at $V_2$.

A pair of curved mirrors 56, 58 are angularly disposed opposite one another adjacent the inside walls of the magnetic field producing coil 12. A laser source 60 producing a laser beam 62 is disposed outside of the coil 12 and positioned to direct its beam 62 into the coil 12 through end 50 and onto the mirror 56 from whence it is reflected back and forth between the mirrors 56, 58 to form a multiple pass of the laser beam 62 with a concentrated or focused portion at 64, which is directly in the path 30 of the combined stream 54 of electrons "e" and O− ions. It will be readily apparent to those skilled in the art that the laser beam could also be directed to enter into the coil 12 through end 52 and initially onto mirror 58 to achieve the same results.

As the combined stream 54 passes through the focused portion 64 of the reflected multiple passes of the laser beam 62, the electrons of a high percentage of the oxygen ions are photodetached. Thus, following the focused portion 64 there is a stream 66 which continues to move longitudinally down the path 30 at its preestablished energy level comprising mainly $O(^3P)$ atoms and O− ions. The small amount of electrons generated from the photo detachment of the O− ions is neglected.

Still within the confines of the coil 12 and the magnetic field 14 thereof (to maintain the density of the stream 66 against the spreading effect of the negative charges on the electrons 18 and O− ions) and along path 30 following the focused portion 64 there are disposed a pair of parallel, spaced electrostatic plates 68, 70 which are connected to a source of electrical power (not shown) in the usual manner for such purposes. The plate 68 nearest as the figure is viewed is connected to a positive voltage while the plate 70 behind it is connected to a negative voltage. The plates 68, 70 are disposed such that the stream 66 passes between them. As a result, the components of the stream 66 are deflected according to their individual velocities. These deflections are represented by the dotted lines 72, 74, and 76. Line 72 represents the path of the $O(^3P)$ atoms which, because of their absence of an electrical charge, are not deflected. Line 74 represents the slight deflection of the electrons 18 while line 76 represents the greater deflection of the O− ions. Faraday cups 78 are positioned to stop the electrons 18 and O− ions thus leaving only the $O(^3P)$ atoms of interest to move onward to the target 80.

While it will be readily recognized by those skilled in the art, the method and apparatus described heretofore and claimed hereinafter, while referring to the production of ground-state oxygen atoms could also be used for the production of other atoms and molecules. To accomplish this, the gas comprising the beam 48 needs to be selected to emit the desired atoms or molecules when bombarded with electrons at the velocity set by the electron gun 44 and the frequency of the multi-pass laser beam 62 needs to be set such as to effect the required photodetachment with respect to the atoms or molecules of interest. The variation of these parameters to accomplish these results without undue experimentation is well within the capability of those skilled in the art and therefore, in the interest of preventing redundancy, further details relative thereto have been omitted from this specification. Additionally, it is the applicants' desire that the specification and claims of the present application be accorded a breadth within the scope and spirit of the invention described herein and not be limited by the use herein of oxygen as a representative example and reference thereto in the claims which follow this specification.

Figure 2:
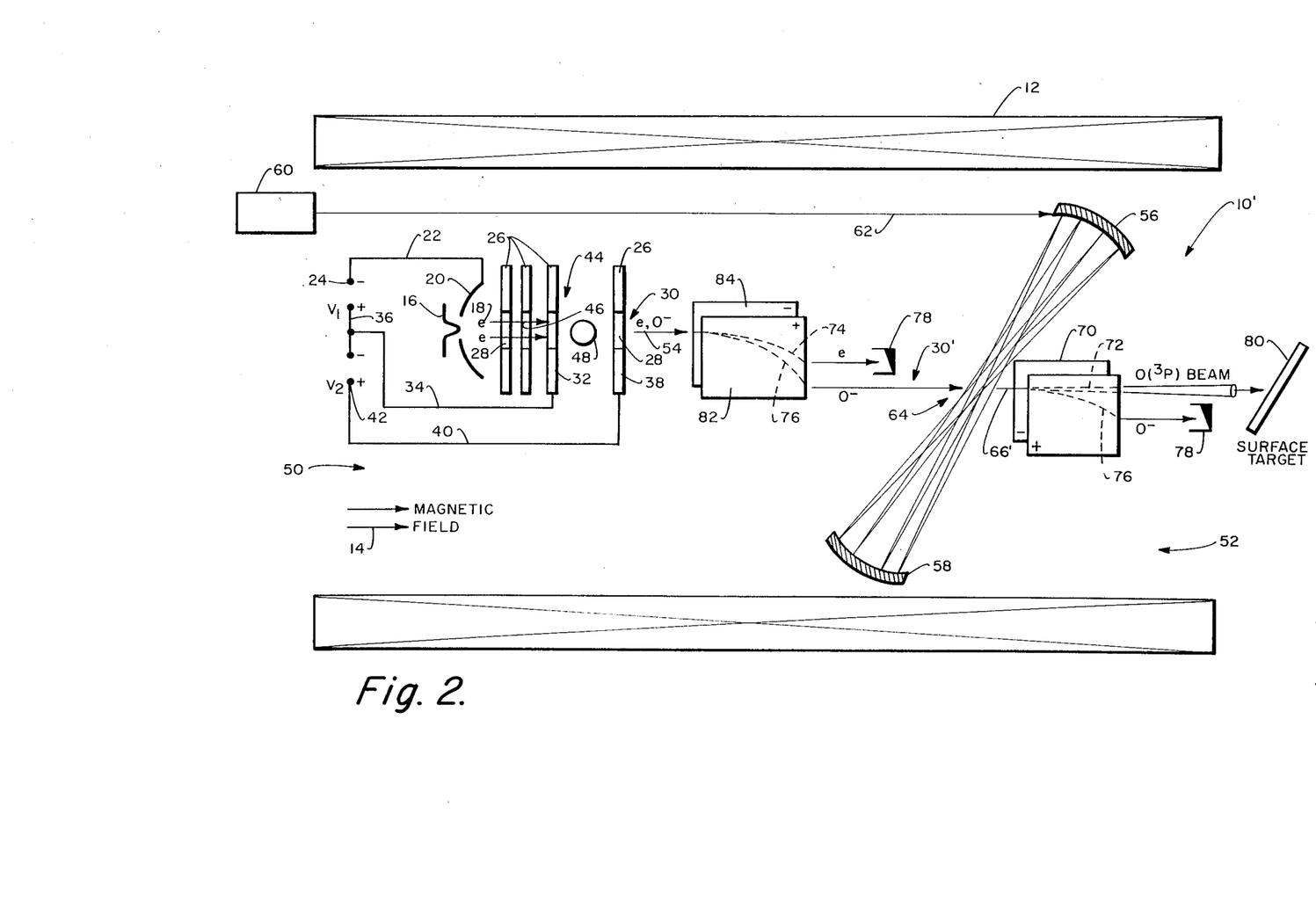
FIG. 2 is a drawing of a simplified longitudinal cross section through apparatus according to the present invention in a second and preferred embodiment thereof.

Having thus described the present invention in a first embodiment for simplicity and ease of understanding, it will now be further described with respect to FIG. 2, which shows the present invention in its preferred embodiment. The basic mode of operation of the two embodiments described herein is the same. In the preferred embodiment of FIG. 2, however, two sets of electrostatic plates are employed. Insofar as the elements of the two embodiments are the same, the numbers employed in the drawings are identical and, to avoid redundancy herein, a redescription thereof is omitted.

Turning now to FIG. 2, as can be seen therein, in the preferred embodiment a second set of electrostatic deflection plates 82 and 84 are disposed along path 30 between second gate 38 and the focused area 64 of the laser beam 62. Thus, the combined beam 54 passes between the plates 82, 84 before passing through the multiple passes of the laser beam 62. As with the plates 68, 70, plates 82, 84 are connected to an appropriate voltage source (not shown) in the usual manner. As a result, the O− ions are deflected along dotted path 76 and continue along path 30' towards focused area 64 of the laser beam 62 while the electrons 18 are deflected less (along path 74) and, therefore, are stopped by a Faraday cup 78. After the photodetachment process in the multiple passes of the laser beam 62, only $O(^3P)$ and O− ions are in the beam 66' which passes between the plates 68, 70. Once again, the O− ions are deflected along the dotted path 76. This time, however, it is the O− ions which are stopped by the Faraday cup 78 while the $O(^3P)$ atoms of interest continue to the target 80 as previously described.

We claim:

1. A variable energy, high flux, ground-state atomic oxygen source comprising:
   (a) means for producing a high density beam of molecules which will emit O− ions when bombarded with electrons;
   (b) means for producing a high current stream of electrons at a low energy level of between 1 and 15 electron volts and for passing said stream of electrons through said high density beam of molecules to produce a stream of O− ions;
   (c) means for accelerating said O− ions to a selected energy level between 3 and 100 electron volts;

(d) means for directing a multiple pass laser beam through said stream of O⁻ ions to strip off the excess electrons from a plurality of said O⁻ ions to produce ground-state O atoms within said stream;

(e) electrostatic deflection means for deflecting the path of said O⁻ ions and said electrons; and, (f) means for stopping said O⁻ ions and said electrons and for allowing only said ground-state O atoms to continue as the source of the atoms of interest.

2. The apparatus of claim 1 wherein said electrostatic deflection means comprises:

(a) a first pair of electrostatic deflection plates positioned before the point at which said multiple pass laser beam passes through said O⁻ ions; and, (b) a second pair of electrostatic deflection plates positioned after the point at which said multiple pass laser beam passes through said O⁻ ions.

3. The apparatus of claim 1 and additionally comprising:

means for producing an intense longitudinal magnetic field to contain all said means of claim 1 whereby the space-charge limited current of said stream of O⁻ ions is maximized.

4. The apparatus of claim 3 wherein:

said means for producing an intense magnetic field comprises an elongated cylindrical coil connected to a source of electric current and adapted to produce a magnetic field in the range of 1–10 Tesla, wherein said coil is disposed to contain all said means of claim 1 therein.

5. The apparatus of claim 4 wherein said mean for directing a multiple pass laser beam through said stream of O⁻ ions to strip off the excess electrons comprises:

(a) a pair of curved mirrors disposed within said magnetic field producing coil so as to have said stream of O⁻ ions pass therebetween; and, (b) a source of a laser beam disposed outside of said coil and adapted to direct said laser beam therefrom longitudinally into said coil and onto one of said pair of mirrors from whence it is directed back and forth between said pair of mirrors to form a focused region of multiple passes of said laser beam within said coil through which said stream of O⁻ ions passes.

6. The apparatus of claim 1 wherein:

said means for producing a high current stream of electrons at a low energy level and for passing said stream of electrons through said high density beam of molecules to produce a stream of O⁻ ions is adjustable to set the energy level of said high current stream of electrons at a selected level within a range of between 1 and 15 electron volts.

7. The apparatus of claim 6 wherein said means for producing a high current stream of electrons and passing said stream of electrons through said high density beam of molecules and said accelerating means in combination comprise:

(a) filament means connected to a high current source of electrical energy for producing a high current source of electrons;

(b) a plurality of gates of an electrically conductive material having apertures therethrough disposed with said apertures forming a path between said filament means and said electrostatic deflection means, one of said gates being disposed adjacent to said high density beam of molecules between said filament means and high density beam of molecules and a second of said gates being disposed adjacent to said high density beam of molecules after said high density beam of molecules with respect to said filament means;

(c) an electrode of an electrically conductive material surrounding said filament means in non-contacting relationship therewith;

(d) a source of a negative electrical voltage connected to said electrode to repel said electrons from said filament means;

(e) a source of a first positive electrical voltage connected to said one of said gates; and, (f) a source of a second positive electrical voltage connected to said second of said gates whereby the relative voltages determine the focusing of the electrons and set the electron voltage level of said electrons and said resultant stream of O⁻ ions.

8. A variable energy, high flux, ground-state atomic oxygen source comprising:

(a) a high density beam of molecules which will emit O⁻ ions when bombarded with electrons;

(b) a high current electron gun producing a high current stream of electrons at a low energy level disposed to pass said stream of electrons through said high density beam of molecules to produce a stream of O⁻ ions, said gun including means for accelerating said O⁻ ions to a desired energy level between 3 and 100 electron volts;

(c) a multiple pass laser beam disposed to pass through said stream of O⁻ ions and photodetach the excess electrons from a plurality of said O⁻ ions to produce ground-state O atoms within said stream;

(d) electrostatic deflection plates disposed to deflect the paths of said O⁻ ions and said electrons; and, (e) Faraday cups disposed to stop said O⁻ ions and said electrons and allow only said ground-state O atoms to continue as the source of the atoms of interest.

9. The apparatus of claim 8 wherein said electrostatic deflection plates comprise:

(a) a first pair of electrostatic deflection plates positioned before the point at which said multiple pass laser beam passes through said O⁻ ions; and, (b) a second pair of electrostatic deflection plates positioned after the point at which said multiple pass laser beam passes through said O⁻ ions.

10. The apparatus of claim 8 and additionally comprising:

an elongated superconducting cylindrical coil connected to a source of electric current and disposed to contain all the elements of claim 8 therein for producing an intense magnetic field longitudinally aligned with said stream of O⁻ ions whereby the spacecharge limited current of said stream is maximized.

11. The apparatus of claim 10 wherein apparatus for producing said multiple pass laser beam comprises:

(a) a pair of curved mirrors disposed within said magnetic field producing coil so as to have said stream of O⁻ ions pass therebetween; and, (b) a source of a laser beam disposed outside of said coil and adapted to direct said laser beam therefrom longitudinally into said coil and onto one of said pair of mirrors from whence it is directed back and forth between said pair of mirrors to form a focused region of multiple passes of said laser beam within said coil through which said stream of O⁻ ions passes.

12. The apparatus of claim 8 wherein:
said electron gun is adjustable to accelerate and set the energy level of said high current stream of electrons at a selected level within a range of between 1 and 15 electron volts and the energy level of said O ions at a selected level within a range of between 3 and 100 electron volts.

13. The apparatus of claim 12 wherein said electron gun comprises:
(a) filament means connected to a high current source of electrical energy for producing a high current source of electrons;
(b) a plurality of gates of an electrically conductive material having apertures therethrough disposed with said apertures forming a path between said filament means and said electrostatic deflection plates, one of said gates being disposed adjacent to said high density beam of molecules between said filament means and high density beam of molecules and a second of said gates being disposed adjacent to said high density beam of molecules after said high density beam of molecules with respect to said filament means;
(c) an electrode of an electrically conductive material surrounding said filament means in non-contacting relationship therewith;
(d) a source of a negative electrical voltage connected to said electrode to repel said electrons from said filament means;
(e) a source of a first positive electrical voltage connected to said one of said gates; and,
(f) a source of a second positive electrical voltage connected to said second of said gates whereby the relative voltages determine the focusing of the electrons and set the electron voltage level of said electrons and said resultant stream of O$^-$ ions.

14. The method of producing a variable energy, high flux, ground-state atomic oxygen source comprising the steps of:
(a) producing a high density beam of molecules which will emit O$^-$ ions when bombarded with electrons;
(b) producing a high current stream of electrons at a low energy level and passing the stream of electrons through the high density beam of molecules to produce a combined stream of electrons and O$^-$ ions;
(c) accelerating the combined stream of electrons and O$^-$ ions to an energy level of between 3 and 100 electron volts;
(d) directing a multiple pass laser beam through the O$^-$ ions to strip off the excess electrons from a plurality of the O$^-$ ions to produce ground-state O atoms;
(e) passing the O$^-$ ions and the electrons through electrostatic deflection means to deflect the path of the O$^-$ ions and the electrons; and,
(f) stopping the deflected O$^-$ ions and electrons to allow only the ground-state O atoms to continue as the source of the atoms of interest.

15. The method of claim 14 and additionally comprising the step of:
producing an intense magnetic field to contain all the elements used in the steps of claim 14 whereby the space-charge limited current of the combined stream is maximized.

16. The method of claim 15 wherein the step of producing a magnetic field thereof comprises the step of:

disposing all the elements used in the steps of claim 14 within an elongated superconducting cylindrical coil operably connected to a source of electric current to produce a magnetic field in the range of 1 to 10 Tesla.

17. The method of claim 16 wherein said step of directing a multiple pass laser beam through the stream of O$^-$ ions to strip off the excess electrons comprises the steps of:
(a) disposing a pair of curved mirrors within the magnetic field producing coil so as to have the combined stream pass therebetween; and,
(b) disposing a source of a laser beam outside of the coil and positioning it to direct the laser beam therefrom longitudinally into the coil and onto one of the pair of mirrors from whence it is directed back and forth between the pair of mirrors to form a focused region of multiple passes of the laser beam within the coil through which the combined stream passes.

18. The method of claim 14 wherein:
said step of producing a high current stream of electrons and passing the stream of electrons through the high density beam of molecules to produce a stream of O$^-$ ions includes adjustably setting the energy level of the high current stream of electrons at a selected level within the range of 1 and 15 electron volts and setting the energy level of the stream of O$^-$ ions at a selected level within the range of 3 and 100 electron volts by the additional steps of:
(a) providing filament means connected to a high current source of electrical energy for producing a high current source of electrons;
(b) disposing a plurality of gates of an electrically conductive material having apertures therethrough with the apertures forming a path between the filament means and the electrostatic deflection means wherein one of the gates is disposed adjacent to the high density beam of molecules between the filament means and high density beam of molecules and a second of the gates is disposed adjacent to the high density beam of molecules after the high density beam of molecules with respect to the filament means;
(c) surrounding the filament means with an electrode of an electrically conductive material which is not in contact therewith;
(d) connecting a source of a negative electrical voltage to the electrode to repel the electrons from the filament means;
(e) connecting a source of a first positive electrical voltage to the one of the gates; and,
(f) connecting a source of a second positive electrical voltage to the second of the gates whereby the relative voltages determine the focusing of the electrons and set the electron voltage level of the electrons and the resultant combined stream of O$^-$ ions.

19. A source of variable energy, high flux, ground-state atoms/molecules comprising:
(a) means for producing a high density beam of atoms/molecules which will emit ionized atoms/molecules when bombarded with electrons;
(b) means for producing a high current stream of electrons at a low energy level and for passing said stream of electrons through said high density beam of atoms/molecules to produce a stream of ionized atoms/molecules at an energy level of between 3 and 100 electron volts;

(c) means for directing a multiple pass laser beam through said stream to strip off the excess electrons from a plurality of said ionized atoms/molecules to produce ground-state atoms/molecules within said stream;

(d) electrostatic deflection means for deflecting the path of said ionized atoms/molecules and said electrons; and, (e) means for stopping said ionized atoms/molecules and said electrons stream and for allowing only said ground-state atoms/molecules to continue as the source of the atoms/molecules of interest.

20. The apparatus of claim 19 wherein said electrostatic deflection means comprises:

(a) a first pair of electrostatic deflection plates positioned before the point at which said multiple pass laser beam passes through said ionized atoms/molecules; and, (b) a second pair of electrostatic deflection plates positioned after the point at which said multiple pass laser beam passes through said ionized atoms/molecules.

21. The apparatus of claim 19 and additionally comprising:

means for producing an intense magnetic field to contain all said means of claim 19 whereby the space-charge limited current of said stream of ionized atoms/molecules is maximized.

22. The apparatus of claim 21 wherein:

said means for producing an intense magnetic field comprises an elongated superconducting cylindrical coil operably connected to a source of electric current to produce a magnetic field in the range of 1 to 10 Tesla and disposed to contain all said means of claim 19 therein.

23. The apparatus of claim 22 wherein said mean for directing a multiple pass laser beam through said stream of ionized atoms/molecules to strip off the excess electrons comprises:

(a) a pair of curved mirrors disposed within said magnetic field producing coil so as to have said stream pass therebetween; and, (b) a source of a laser beam disposed outside of said coil and adapted to direct said laser beam therefrom longitudinally into said coil and onto one of said pair of mirrors from whence it is directed back and forth between said pair of mirrors to form a focused region of multiple passes of said laser beam within said coil through which said stream of ionized atoms/molecules passes.

24. The apparatus of claim 19 wherein:

said means for producing a high current stream of electrons and for passing said stream of electrons through said high density beam of molecules to produce a stream of ionized atoms/molecules includes means for adjustably accelerating said high current stream of electrons to a selected energy level of between 1 and 15 electron volts and for adjustably accelerating said stream of ionized atoms/molecules to a selected energy level of between 3 and 100 electron volts.

25. The apparatus of claim 24 wherein said means for producing a high current stream of electrons, passing said stream of electrons through said high density beam of molecules and accelerating said electrons and ionized atoms/molecules comprises:

(a) filament means connected to a high current source of electrical energy for producing a high current source of electrons;

(b) a plurality of gates of an electrically conductive material having apertures therethrough disposed with said apertures forming a path between said filament means and said electrostatic deflection means, one of said gates being disposed adjacent to said high density beam of molecules between said filament means and high density beam of molecules and a second of said gates being disposed adjacent to said high density beam of molecules after said high density beam of molecules with respect to said filament means;

(c) an electrode of an electrically conductive material surrounding said filament means in non-contacting relationship therewith;

(d) a source of a negative electrical voltage connected to said electrode to repel said electrons from said filament means;

(e) a source of a first positive electrical voltage connected to said one of said gates; and, (f) a source of a second positive electrical voltage connected to said second of said gates whereby the relative voltages determine the focusing of the electrons and set the electron voltage level of said electrons and said resultant stream of ionized atoms/molecules.

26. A source of variable energy, high flux, ground-state atoms/molecules comprising:

(a) a high density beam of molecules which will emit ionized atoms/molecules when bombarded with electrons;

(b) a high current electron gun producing a high current stream of electrons at an energy level of between 1 and 15 electron volts disposed to pass said stream of electrons through said high density beam of molecules to produce a stream of ionized atoms/molecules and accelerate said stream of ionized atoms/molecules to an energy level of 3 to 100 electron volts;

(c) a multiple pass laser beam disposed to pass through said stream of ionized atoms/molecules and photodetach the excess electrons from a plurality of said ionized atoms/molecules to produce ground-state atoms/molecules within said stream;

(d) electrostatic deflection plates disposed to deflect the paths of said ionized atoms/molecules and said electrons; and, (e) Faraday cups disposed to stop said ionized atoms/molecules and said electrons and allow only said ground-state atoms/molecules to continue as the source of the atoms/molecules of interest.

27. The apparatus of claim 26 wherein said electrostatic deflection plates comprise:

(a) a first pair of electrostatic deflection plates positioned before the point at which said multiple pass laser beam passes through said ionized atoms/molecules; and, (b) a second pair of electrostatic deflection plates positioned after the point at which said multiple pass laser beam passes through said ionized atoms/molecules.

28. The apparatus of claim 26 and additionally comprising:

an elongated superconducting cylindrical coil operably connected to a source of electric current to produce a magnetic field and disposed to contain all the elements of claim 26 therein for producing an intense magnetic field in the range of 1 to 10 Tesla longitudinally aligned with said stream of ionized atoms/molecules whereby the space-charge limited current of said stream of ionized atoms/molecules is maximized.

29. The apparatus of claim 28 wherein apparatus for producing said multiple pass laser beam comprises:
   (a) a pair of curved mirrors disposed within said magnetic field producing coil so as to have said stream of ionized atoms/molecules pass therebetween; and,
   (b) a source of a laser beam disposed outside of said coil and adapted to direct said laser beam therefrom longitudinally into said coil and onto one of said pair of mirrors from whence it is directed back and forth between said pair of mirrors to form a focused region of multiple passes of said laser beam within said coil through which said stream of ionized atoms/molecules passes.

30. The apparatus of claim 26 wherein:
   said electron gun is adapted to adjustably accelerate said high current stream of electrons to set the energy level thereof at a selected energy level within a range of between 1 and 15 electron volts and to adjustably accelerate said stream of ionized atoms/molecules to set the energy level thereof at a selected energy level within a range of between 3 and 100 electron volts.

31. The apparatus of claim 30 wherein said electron gun comprises:
   (a) filament means connected to a high current source of electrical energy for producing a high current source of electrons;
   (b) a plurality of gates of an electrically conductive material having apertures therethrough disposed with said apertures forming a path between said filament means and said electrostatic deflection plates, one of said gates being disposed adjacent to said high density beam of molecules between said filament means and high density beam of molecules and a second of said gates being disposed adjacent to said high density beam of molecules after said high density beam of molecules with respect to said filament means;
   (c) an electrode of an electrically conductive material surrounding said filament means in noncontacting relationship therewith;
   (d) a source of a negative electrical voltage connected to said electrode to repel said electrons from said filament means;
   (e) a source of a first positive electrical voltage connected to said one of said gates; and,
   (f) a source of a second positive electrical voltage connected to said second of said gates whereby the relative voltages determine the focusing of the electrons and set the electron voltage level of said electrons and said resultant stream of ionized atoms/molecules.

32. The method of producing a stream of variable energy, high flux, ground-state atoms/molecules comprising the steps of:
   (a) producing a high density beam of molecules which will emit ionized atoms/molecules when bombarded with electrons;
   (b) producing a high current stream of electrons at an energy level of between 1 and 15 electron volts and passing the stream of electrons through the high density beam of molecules to produce a combined stream of electrons and ionized atoms/molecules;
   (c) accelerating the combined stream of electrons and ionized atoms/molecules to an energy level of between 3 and 100 electron volts;
   (d) directing a multiple pass laser beam through the ionized atoms/molecules to strip off the excess electrons from a plurality of the ionized atoms/molecules to produce ground-state atoms/molecules;
   (e) passing the ionized atoms/molecules and the electrons through electrostatic deflection means to deflect the path of the ionized atoms/molecules and the electrons; and,
   (f) stopping the deflected ionized atoms/molecules and electrons to allow only the groundstate atoms/molecules to continue as the source of the atoms/molecules of interest.

33. The method of claim 32 and additionally comprising the step of:
   producing an intense magnetic field in the range of 1 to 10 Tesla to contain all the elements used in the steps of claim 32 whereby the space-charge limited current of the combined stream is maximized.

34. The method of claim 33 wherein the step of producing a magnetic field comprises:
   disposing all the elements used in the steps of claim 32 within an elongated cylindrical coil operably connected to a source of electric current.

35. The method of claim 34 wherein said step of directing a multiple pass laser beam through the stream of ionized atoms/molecules to strip off the excess electrons comprises the steps of:
   (a) disposing a pair of curved mirrors within the magnetic field producing coil so as to have the stream pass therebetween; and,
   (b) disposing a source of a laser beam outside of the coil and positioning it to direct the laser beam therefrom longitudinally into the coil and onto one of the pair of mirrors from whence it is directed back and forth between the pair of mirrors to form a focused region of multiple passes of the laser beam within the coil through which the stream passes.

36. The method of claim 32 wherein:
   said step of producing a high current stream of electrons and passing the stream of electrons through the high density beam of molecules to produce a stream of ionized atoms/molecules includes adjustably setting the energy level of the high current stream of electrons at a selected level within the range of 1 and 15 electron volts and adjustably setting the energy level of the stream of ionized atoms/molecules at a selected level within the range of 3 and 100 electron volts by the additional steps of:
   (a) providing filament means connected to a high current source of electrical energy for producing a high current source of electrons;
   (b) disposing a plurality of gates of an electrically conductive material having apertures therethrough with the apertures forming a path between the filament means and the electrostatic deflection means wherein one of the gates is disposed adjacent to the high density beam of molecules between the filament means and high density beam of molecules and a second of the gates is disposed adjacent to the high density beam of molecules after the high density beam of molecules with respect to the filament means;
(c) surrounding the filament means with an electrode of an electrically conductive material which is not in contact therewith;
(d) connecting a source of a negative electrical voltage to the electrode to repel the electrons from the filament means;
(e) connecting a source of a first positive electrical voltage to the one of the gates; and,
(f) connecting a source of a second positive electrical voltage to the second of the gates whereby the relative voltages determine the focusing of the electrons and set the electron voltage level of the electrons and the resultant combined stream of ionized atoms/molecules.

* * * * *